United States Patent Office 3,775,477
Patented Nov. 27, 1973

3,775,477
N,N'-BIS[2-ARYL-2-(HYDROXY OR OXO)-ETHYL]-
BRIDGED-BIS-CARBOXAMIDES
Guy D. Diana, Stephentown, N.Y., assignor to Sterling
  Drug Inc., New York, N.Y.
No Drawing. Filed Mar. 10, 1971, Ser. No. 123,095
    Int. Cl. C07c 103/38, 103/42
U.S. Cl. 260—558 A                              19 Claims

ABSTRACT OF THE DISCLOSURE

Condensation of an amine of the formula

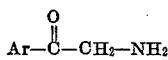

and a diacid dihalide of the formula

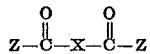

provides N,N' - bis[2-aryl-2-oxoethyl]-bridged-biscarboxamides of the formula

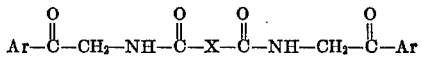

reduction of which provides N,N'-bis[2-aryl-2-hydroxyethyl]-bridged-biscarboxamides of the formula

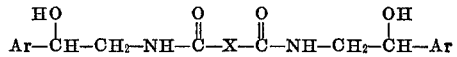

and N,N'-bridged-bis[2-aryl-2-hydroxyethylamines] of the formula

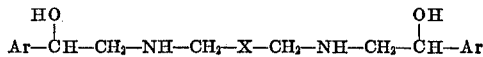

The latter compounds are also prepared by condensation of an epoxide of the formula

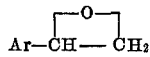

with a diamine of the formula

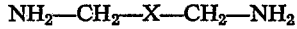

The products have antibacterial activity in vitro and are useful as antibacterial agents.

---

This invention relates to compositions of matter classified in the art of organic chemistry as N,N'-bis[2-aryl-2-hydroxy or oxo-ethyl]-bridged-biscarboxamides and to processes for preparing them.

In its composition of matter aspect my invention provides N,N' - bis[2 - (Ar)-2-(Y)-2-(Y')-ethyl]-(X)-biscarboxamide of the formula

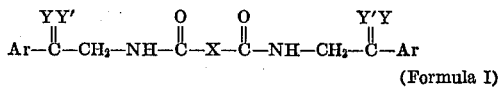

(Formula I)

wherein:

Ar is phenyl or phenyl substituted by one to three members selected from the group consisting of non-tertiary alkyl of one to four carbon atoms, non-tertiary alkoxy of one to four carbon atoms and halo or by a member selected from the group consisting of trifluoromethyl, dimethylamino, acetamido, nitro, methylthio and methylsulfonyl;

X is alkylene of two to ten carbon atoms with bonds to the adjacent carbon atoms at different carbon atoms;

Y, when taken alone, is hydrogen;

Y', when taken alone, is hydroxyl; and

Y, when taken together with Y', is carbonyl oxygen.

The compounds of Formula I have antibacterial activity in vitro and are useful as antibacterial agents. The compounds of Formula I wherein Y and Y' taken together are carbonyl oxygen, namely N,N'-bis[2-(Ar)-2-oxoethyl]-(X)-biscarboxamides, are also useful as intermediates for the preparation of N,N'-[methylene-(X)-methylene]-bis-[2-(Ar)-2-hydroxyethylamines][1] of the formula

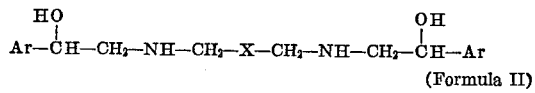

(Formula II)

wherein Ar and X have the same meanings ascribed thereto above in Formula I. The compounds of Formula II and acid-addition salts thereof also have antibacterial activity in vitro and are useful as antibacterial agents.

In one of its process aspects my invention provides the process for preparing N,N'-bis[2-(Ar)-2-oxoethyl]-(X)-bis-carboxamide of Formula I, wherein Y and Y' taken together are carbonyl oxygen, which comprises condensing an amine of the formula

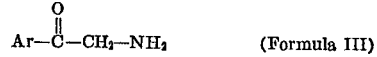
(Formula III)

with a diacid dihalide of the formula

(Formula IV)

wherein Ar of Formula III and X of Formula IV have the same meanings ascribed thereto above in Formula I and Z is chloro or bromo.

In a second process aspect my invention provides the process for preparing N,N'-bis[2-(Ar)-2-hydroxyethyl]-(X)-biscarboxamide of Formula I, wherein Y is hydrogen and Y' is hydroxyl, which comprises reducing N,N'-bis[2-(Ar)-2-oxoethyl]-(X)-biscarboxamide of Formula I, wherein Y and Y' taken together are carbonyl oxygen, with sodium borohydride.

In a third process aspect my invention provides the process for preparing N,N'-[methylene-(X)-methylene]-bis[2-(Ar) - 2 - hydroxyethylamine] of Formula II which comprises reducing N,N'-bis[2-(Ar)-2-oxoethyl]-(X)-biscarboxamide of Formula I, wherein Y and Y' taken together are carbonyl oxygen, with diborane, lithium aluminum hydride, trialkylaluminum or dialkylaluminum hydride, wherein alkyl of trialkylaluminum and dialkylaluminum is ethyl, propyl, isopropyl, butyl, isobutyl or sec-butyl.

An alternative process for preparing N,N'-[methylene-(X)-methylene]-bis[2-(Ar) - 2 - hydroxyethylamine] of Formula II comprises condensing an epoxide of the formula

(Formula V with a diamine of the formula

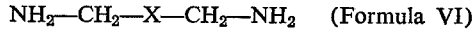   (Formula VI)

wherein Ar of Formula V and X of Formula VI have the same meanings ascribed thereto above in Formula I.

When Ar is phenyl substituted by non-tertiary alkyl of one to four carbon atoms, non-tertiary alkyl is methyl, ethyl, propyl, isopropyl, butyl, isobutyl or sec-butyl.

When Ar is phenyl substituted by non-tertiary alkoxy of one to four carbon atoms, non-tertiary alkoxy is methoxy, ethoxy, propoxy, isopropoxy, butoxy, isobutoxy or sec-butoxy.

When Ar is phenyl substituted by halo, halo is fluoro, chloro, bromo or iodo.

When X is alkylene of two to ten carbon atoms with bonds to the adjacent carbon atoms at different carbon atoms, it can be unbranched or branched. If unbranched, X is 1,2-ethylene, 1,3-propylene, 1,4-butylene, 1,5-pentylene, 1,6-hexylene, 1,4-heptylene, 1,8-octylene, 1,9-nonylene or 1,10-decylene. If branched, X is, for example, 2-methyl-1,4-butylene. Since X and the attached methylenes are integral in the compounds of Formula II, they are named integrally. Thus, the illustrated alkylenes become, respectively, 1,4-butylene, 1,5-pentylene, 1,6-hexylene, 1,7-heptylene, 1,8-octylene, 1,9-nonylene, 1,10-decylene, 1,11-undecylene, 1,12-dodecylene and 3-methyl-1,6-hexylene.

The manner and process of making and using the invention and the best mode of carrying it out will now be described so as to enable any person skilled in the art to which it pertains to make and use it.

The preferred method for carrying out the process of condensing an amine of Formula III with a diacid dihalide of Formula IV is the use of an acid addition salt of the amine of Formula III, for example, the hydrochloride or the hydrobromide, an acid acceptor, for example, triethylamine or pyridine, and a solvent inert under the reaction conditions, for example, acetonitrile, benzene, chloroform, N,N-dimethylformamide or tetrahydrofuran at a temperature in the range of 0 to 100° C. The hydrochloride is the preferred amine salt, triethylamine is the preferred acid acceptor, chloroform is the preferred solvent and room temperature is the preferred temperature.

The preferred method for carrying out the process of reducing N,N'-bis[2-(Ar)-2-oxoethyl] - (X) - biscarboxamide of Formula I, wherein Y and Y' taken together are carbonyl oxygen, with sodium borohydride is the use of methanol as a solvent at a temperature in the range of 0 to 70° C. A cosolvent, for example, dioxane or tetrahydrofuran, can also be used.

The preferred method for carrying out the process of reducing N,N'-bis[2-(Ar)-2-oxoethyl] - (X) - biscarboxamide of Formula I, wherein Y and Y' taken together are carbonyl oxygen, with diborane, lithium aluminum hydride, trialkylaluminum or dialkylaluminum hydride is the use of a solvent inert under the reaction conditions, for example, benzene, 1,2-dimethoxyethane, heptane, dioxane or tetrahydrofuran at a temperature in the range of 0–120° C. Tetrahydrofuran is the preferred solvent and the reflux temperature of the tetrahydrofuran solution of the reactants is the preferred temperature. Examples of trialkylaluminum and dialkylaluminum hydride as the reducing agent in the present process include triethylaluminum, triisopropylaluminum, triisobutylaluminum, diethylaluminum hydride, diisopropylaluminum hydride and diisobutylaluminum hydride.

The preferred method for carrying out the process of condensing an epoxide of Formula V with a diamine of Formula VI is the use of a solvent inert under the reaction conditions, for example, acetonitrile, benzene, chloroform, N,N-dimethylformamide, ethanol, methanol or tetrahydrofuran at a temperature in the range of 0 to 100° C. Acetonitrile is the preferred solvent and the reflux temperature of the acetonitrile solution of the reactants is the preferred temperature.

Formation of acid-addition salts of the compounds of Formula II is accomplished by standard methods with any pharmaceutically acceptable inorganic (mineral) or organic acid. If inorganic, the acid can be, for example, hdrochloric acid, hydrobromic acid, nitric acid, phosphoric acid or sulfamic acid. If organic, the acid can be, for example, acetic acid, glycolic acid, lactic acid, quinic acid, hydrocinnamic acid, succinic acid, tartaric acid, citric acid, methanesulfonic acid or benzenesulfonic acid.

That the acid be pharmaceutically acceptable means that the beneficial properties inherent in the free base not be vitiated by side effects ascribable to the anions.

Although pharmaceutically acceptable salts are preferred, all acid-addition salts are within the scope of the invention. A pharmaceutically unacceptable salt may be useful, for example, for purposes of identification or purification or in preparing a pharmaceutically acceptable salt by ion-exchange procedures.

The intermediate amines of Formula III are a known class of compounds, which may be prepared, for example, by brominating the corresponding acetophenone, treating the resulting α-bromoacetophenone with hexamethylenetetramine and treating the resulting product with ethanolic hydrochloric acid, thus producing the hydrochloride salt.

The intermediate diacid dihalides of Formula IV are also a known class of compounds, which may be prepared, for example, by treating the corresponding diacid with thionyl chloride or thionyl bromide.

The intermediate epoxides of Formula V are a known class of compounds. Their preparation is accomplished by epoxidation of the corresponding styrenes by any of several well-known methods, for example, by the use of peracetic acid buffered with sodium acetate. The styrenes are known compounds, some of which are commercially available.

The intermediate diamines of Formula VI are also a known class of compounds, some of which are commercially available. Preparation of those which are not commercially available is accomplished by well-known methods, for example, by reductive amination of the corresponding diketone or dialdehyde, amination of the corresponding dihalide or dialcohol p-toluenesulfonate diester or reduction of the corresponding dinitrile, dioxime, diamide, diazide or other di-higher-oxidation-state nitrogen compound. Unsymmetrical diamines can be prepared from unsymmetrical starting materials.

The compounds of Formula I and acid-addition salts thereof and the compounds of Formula II are purified by recrystallization. Their structures follow from their route of synthesis and are corroborated by infrared spectral analysis and by the correspondence of calculated and found values of elemental analysis of representative samples.

As stated above the compounds of Formula I and acid-addition salts thereof and the compounds of Formula II have antibacterial activity in vitro, which was determined by a standard serial dilution test. In this test the concentration of compound arresting the growth of the microorganism is the bacteriostatic concentration and is expressed in parts per million (p.p.m.). The concentration of compound preventing growth of the microorganism after further incubation is the bactericidal concentration and is also expressed in parts per million.

The compounds of Formula I and acid-addition salts thereof and the compounds of Formula II are useful as antibacterial agents and are especially useful for disinfecting and sanitizing living and non-living surfaces by conventional swabbing, padding, spraying, immersing, rinsing and the like techniques. Depending on the particular purpose involved, the compounds are used in aqueous solution, in aqueous detergent solutions or in solutions in organic solvents.

The following examples illustrate specific embodiments of my invention without limiting the latter thereto.

EXAMPLE 1

Adipoyl chloride (9.93 g.) was added dropwise with stirring to a filtered mixture of α-amino-p-bromoacetophenone hydrochloride (26.7 g.), triethylamine (21.9 g.) and chloroform (500 ml.) and stirring was continued (for 1 hr.) at room temperature. Recrystallization of the resulting solid (19 g.) from N,N-dimethylformamide gave N,N'-bis[2-(p - bromophenyl)-2-oxoethyl]-1,4-butylenebiscarboxamide (I: Ar=p-BrC$_6$H$_4$, X=(CH$_2$)$_4$, Y+Y'=0) (12.3 g., M.P. 254.0–256.0° C.).

Table I shows the results of the antibacterial testing in vitro of N,N'-bis[2-(p-bromophenyl)-2-oxoethyl]-1,4-butylenebiscarboxamide.

TABLE I

| Microorganism | Concentration (p.p.m.) | |
| --- | --- | --- |
| | Bacteriostatic | Bactericidal |
| Staphylococcus aureus | 100 | 100 |
| Eberthella typhi | 50 | 100 |
| Clostridium welchii | 75 | 100 |
| Pseudomonas aeruginosa | 100 | 100 |

N,N'-bis[2-(p-bromophenyl) - 2 - oxoethyl]-1,4-butylenebiscarboxamide (16.7 g.) was added in small portions with stirring and with the reaction temperature maintained at 0° C. to a solution of diborane (1 M, 248 ml.) in tetrahydrofuran. The solution was heated under reflux and under nitrogen (for 1½ hr.). Hydrochloric acid (6 M, 35 ml.) was added, the resulting solid was separated by filtration and the filtrate was stripped of tetrahydrofuran. Water (100 ml.) and sodium hydroxide (35%, 20 ml.) were added to the combined residue and solid and the mixture was stirred (for 30 min.). Since the resulting solid appeared to be a mixture of hydrochloride salt and free base, it was suspended in methanol and treated with hydrochloric acid. A solution of the resulting solid in water (1 l.) was filtered and the filtrate was basified with aqueous ammonia. Recrystallization of the resulting solid (13.7 g.) from ethyl acetate gave N,N'-(1,6-hexylene)-bis[2-(p-bromophenyl) - 2 - hydroxyethylamine] (II: Ar=p-BrC$_6$H$_4$, X=(CH$_2$)$_4$) (10.5 g., M.P. 145.8–149.0° C.).

Table II shows the results of the antibacterial testing in vitro of N,N'-(1,6-hexylene)-bis[2-(p-bromophenyl)-2-hydroxyethylamine].

TABLE II

| Microorganism | Concentration (p.p.m.) | |
| --- | --- | --- |
| | Bacteriostatic | Bactericidal |
| Staphylococcus aureus | 7.5 | 10 |
| Eberthella typhi | 10 | 25 |
| Clostridium welchii | 75 | 75 |
| Pseudomonas aeruginosa | 75 | >100 |

EXAMPLE 2

(A) A solution of styrene oxide (22.0 g.), hexamethylenediamine (11.6 g.) and acetonitrile (100 ml.) was heated under reflux overnight, then cooled. Two recrystallizations of the resulting solid from ethanol gave N,N'-(1,6 - hexylene)-bis[2-phenyl-2-hydroxyethylamine] (II: Ar=C$_6$H$_5$, X=(CH$_2$)$_4$) (3.9 g., M.P. 158–159.4° C.).

Table III shows the results of the antibacterial testing in vitro of N,N'-(1,6-hexylene)-bis[2-phenyl-2-hydroxyethylamine].

TABLE III

| Microorganism | Concentration (p.p.m.) | |
| --- | --- | --- |
| | Bacteriostatic | Bactericidal |
| Staphylococcus aureus | 100 | >100 |
| Eberthella typhi | 100 | >100 |
| Clostridium welchii | >100 | |
| Pseudomonas aeruginosa | 75 | >100 |

Treatment of N,N'-(1,6-hexylene)-bis[2-phenyl-2-hydroxyethylamine] with hydrochloric acid, hydrobromic acid, nitric acid, phosphoric acid, sulfamic acid, acetic acid, glycolic acid, lactic acid, quinic acid, hydrocinnamic acid, succinic acid, tartaric acid, citric acid, methanesulfonic acid and benzenesulfonic acid affords, respectively, the following acid-addition salts:

N,N'-(1,6-hexylene)-bis[2-phenyl-2-hydroxyethylamine] dihydrochloride,
N,N'-(1,6-hexylene)-bis[2-phenyl-2-hydroxyethylamine] dihydrobromide,
N,N'-(1,6-hexylene)-bis[2-phenyl-2-hydroxyethylamine] dinitrate,
N,N'-(1,6-hexylene)-bis[2-phenyl-2-hydroxyethylamine] diphosphate,
N,N'-(1,6-hexylene)-bis[2-phenyl-2-hydroxyethylamine] disulfamate,
N,N'-(1,6-hexylene)-bis[2-phenyl-2-hydroxyethylamine] diacetate,
N,N'-(1,6-hexylene)-bis[2-phenyl-2-hydroxyethylamine] diglycolate,
N,N'-(1,6-hexylene)-bis[2-phenyl-2-hydroxyethylamine] dilactate,
N,N'-(1,6-hexylene)-bis[2-phenyl-2-hydroxyethylamine] diquinate,
N,N'-(1,6-hexylene)-bis[2-phenyl-2-hydroxyethylamine] dihydrocinnamate,
N,N'-(1,6-hexylene)-bis[2-phenyl-2-hydroxyethylamine] succinate,
N,N'-(1,6-hexylene)-bis[2-phenyl-2-hydroxyethylamine] tartrate,
N,N'-(1,6-hexylene)-bis[2-phenyl-2-hydroxyethylamine] dicitrate,
N,N'-(1,6-hexylene)-bis[2-phenyl-2-hydroxyethylamine] dimethanesulfonate and
N,N'-(1,6-hexylene)-bis[2-phenyl-2-hydroxyethylamine] dibenzenesulfonate.

(B) Condensation of α-aminoacetophenone hydrobromide and adipoyl bromide affords N,N'-bis[2-phenyl-2 - oxoethyl] - 1,4-butylenebiscarboxamide (I: Ar=C$_6$H$_5$, X=(CH$_2$)$_4$, Y+Y'=0).

Reduction of N,N'-bis[2-phenyl-2-oxoethyl]-1,4-butylenebiscarboxamide with diborane also affords N,N'(1,6-hexylene)-bis[2-phenyl-2-hydroxyethylamine].

EXAMPLE 3

Condensation of α-amino-o-methylacetophenone hydrobromide and adipoyl bromide affords N,N'-bis[2-(o-methylphenyl) - 2-oxoethyl]-1,4-butylenebiscarboxamide (I: Ar=o-CH$_3$C$_6$H$_4$, X=(CH$_2$)$_4$, Y+Y'=0).

Reduction of N,N'-bis[2-(o-methylphenyl)-2-oxoethyl]-1,4-butylenebiscarboxamide with diborane affords N,N'-(1,6-hexylene)-bis[2-(o-methylphenyl) - 2-hydroxyethylamine] (II: Ar=o-CH$_3$C$_6$H$_4$, X=(CH$_2$)$_4$).

EXAMPLE 4

Condensation of α-amino-p-isopropylacetophenone hydrochloride and adipoyl chloride affords N,N'-bis[2-(p-isopropylphenyl) - 2 - oxoethyl]-1,4-butylenebicarboxamide (I: Ar=p-(CH$_3$)$_2$CHC$_6$H$_4$, X=(CH$_2$)$_4$, Y+Y'=0)

Reduction of N,N' - bis[2-(p-isopropylphenyl)-2-oxoethyl] - 1,4 - butylenebiscarboxamide with diborane affords N,N' - (1,6 - hexylene)-bis[2-(p-isopropylphenyl)-2 - hydroxyethylamine] (II: Ar=p-(CH$_3$)$_2$CHC$_6$H$_4$, X=(CH$_2$)$_4$).

EXAMPLE 5

In a manner similar to that of Example 1, condensation of α-amino-p-methoxyacetophenone hydrochloride (66.7 g.) and adipoyl chloride (30.4 g.) and two recrystallizations of part (11.7 g.) of the product from N,N-dimethylformamide gave N,N'-bis[2-(p-methoxyphenyl) - 2 - oxoethyl] - 1,4-butylenebiscarboxamide (I: Ar=p-CH$_3$OC$_6$H$_4$, X=(CH$_2$)$_4$, Y+Y'=0).

(5.0 g., M.P. 209.0–215.4° C.).

Reduction of N,N-bis[2-(p-methoxyphenyl) - 2 - oxoethyl] - 1,4 - butylenebiscarboxamide with diborane affords N,N' - (1,6 - hexylene) - bis[2 - (p-methoxyphenyl)-2-hydroxyethylamine] (II: Ar=p-CH$_3$OC$_6$H$_4$,

X=(CH$_2$)$_4$)

EXAMPLE 6

Condensation of α-amino-p-(sec-butoxy)acetophenone hydrochloride and adipoyl chloride affords N,N'-bis[2-(p-(sec-butoxy)phenyl) - 2 - oxoethyl]-1,4-butylenebiscarboxamide (I: Ar=p-CH$_3$CH$_2$(CH$_3$)CHOC$_6$H$_4$, X=(CH$_2$)$_4$ Y+Y'=0).

Reduction of N,N'-bis[2-(p-(sec-butoxy)phenyl)-2-oxoethyl]-1,4-butylenebiscarboxamide with diborane affords N,N' - (1,6-hexylene) - bis[2 - (p-sec-butoxy)phenyl)-2-hydroxyethylamine]

(II: Ar=p-CH$_3$CH$_2$(CH$_3$)CHOC$_6$H$_4$, X=(CH$_2$)$_4$)

EXAMPLE 7

Condensation of α-amino-p-fluoroacetophenone hydrochloride and adipoyl chloride affords N,N'-bis[2-(p-fluorophenyl) - 2 - oxoethyl] - 1,4 - butylenebiscarboxamide (I: Ar=p-FC$_6$H$_4$, X=(CH$_2$)$_4$, Y+Y'=0).

Reduction of N,N'-bis[2-(p-fluorophenyl)-2-oxoethyl]-1,4-butylenebiscarboxamide with diborane affords N,N'-(1,6-hexylene)-bis[2-(p-fluorophenyl) - 2 - hydroxyethylamine] (II: Ar=p-FC$_6$H$_4$, X=(CH$_2$)$_4$).

EXAMPLE 8

(A) In a manner similar to that of Example 1, condensation of α-amino-m-chloroacetophenone hydrochloride (40 g.) and adipoyl chloride (17.75 g.) and recrystallization of the resulting product from N,N-dimethylformamide gave N,N' - bis[2 - (m - chlorophenyl)-2-oxoethyl]-1,4-butylenebiscarboxamide (I: Ar=m-ClC$_6$H$_4$, X=(CH$_2$)$_4$, Y+Y'=0), (30 g., M.P. 198.6–200.2° C.).

A solution of lithium aluminum hydride (3.58 g.) in tetrahydrofuran (500 ml.) was heated under reflux with stirring overnight in a Soxhlet extraction apparatus containing N,N' - bis[2 - (m - chlorophenyl)-2-oxoethyl]-1,4 - butylenebiscarboxamide (17.3 g.) in the extraction thimble. A solution of water (8 ml.) and tetrahydrofuran (8 ml.) was added. Separation of the solid by filtration and chilling the filtrate gave a solid (7 g.), which was combined with material from another run and recrystallized from N,N-dimethylformamide, affording N,N'-(1,6-hexylene) - bis - [2 - (m-chlorophenyl)-2-hydroxyethylamine] (II: Ar=m-ClC$_6$H$_4$, X=(CH$_2$)$_4$) (10.9 g., M.P. 141.8–146.6° C.).

(B) Reduction of N,N' - bis[2 - (m - chlorophenyl)-2-oxoethyl] - 1,4 - butylenebiscarboxamide with triethylaluminum also affords N,N' - (1,6-hexylene)-bis[2-(m-chlorophenyl)-2-hydroxyethylamine].

(C) Reduction of N,N' - bis[2 - (m-chlorophenyl)-2-oxoethyl] - 1,4 - butylenebiscarboxamide with diisopropylaluminum hydride also affords N,N'-(1,6-hexylene)-bis[2-(m-chlorophenyl)-2-hydroxyethylamine].

EXAMPLE 9

In a manner similar to that of Example 1, condensation of α-amino - p - chloroacetophenone hydrochloride (76.4 g.) and adipoyl chloride (32.2 g.) and recrystallization of part (20 g.) of the product (70.3 g.) from N,N-dimethylformamide gave N,N'-bis[2-(p-chlorophenyl) - 2 - oxoethyl] - 1,4 - butylenebiscarboxamide (I: Ar=p-ClC$_6$H$_4$, X=(CH$_2$)$_4$, Y+Y'=0) (16 g., M.P. 260.0–264.0° C.).

In a manner similar to that of Example 1, reduction of N,N'-bis[2-(p-chlorophenyl) - 2 - oxoethyl] - 1,4 - butylenebis carboxamide (31 g.) with diborane (1 M in tetrahydrofuran, 562 ml.) and recrystallization of the resulting product first from ethanol and then twice from methanol gave N,N'-(1,6-hexylene)-bis[2-(p-chlorophenyl - 2 - hydroxyethylamine] (II: Ar=p-ClC$_6$H$_4$, X=(CH$_2$)$_4$) (7.6 g., M.P. 156.0–159.4° C.).

EXAMPLE 10

Condensation of α-amino-p-iodoacetophenone hydrochloride and adipoyl chloride affords N,N'-bis[2-(p-iodophenyl)-2-oxoethyl] - 1,4 - butylenebiscarboxamide (I: Ar=p-IC$_6$H$_4$, X=(CH$_2$)$_4$, Y+Y'=0).

Reduction of N,N'-bis[2-(p - iodophenyl) - 2 - oxoethyl]-1,4-butylenebiscarboxamide with diborane affords N,N'-(1,6-hexylene) - bis[2 - (p - iodophenyl) - 2 - hydroxyethylamine] (II: Ar=p-IC$_6$H$_3$, X=(CH$_2$)$_4$).

EXAMPLE 11

In a manner similar to that of Example 1, condensation of α-amino - 3,4 - dichloroacetophenone hydrochloride (15.46 g.) and adipoyl chloride (5.63 g.) and recrystallization of the resulting product (9.7 g.) from methanol gave N,N'-bis[2-(3,4-dichlorophenyl)-2 - oxoethyl] - 1,4-butylenebiscarboxamide (I: Ar=3,4-Cl$_2$C$_6$H$_3$, X=(CH$_2$)$_4$, Y+Y'=0) (8.0 g., M.P. 188.0–198.0° C.).

Reduction of N,N'-bis[2-(3,4-dichlorophenyl)-2-oxoethyl]-1,4-butylenebiscarboxamide with diborane affords N,N'-(1,6 - hexylene) - bis[2 - (3,4 - dichlorophenyl)-2-hydroxyethylamine] (II: Ar=3,4-Cl$_2$C$_6$H$_3$, X=(CH$_2$)$_4$).

EXAMPLE 12

In a manner similar to that of Example 1, condensation of α-amino-2,5-dichloroacetophenone hydrochloride (two runs, 10 g. and 63 g.) and adipoyl chloride (3.8 g. and 24 g.) and recrystallization of the combined products (14.9 g.) from nitromethane gave N,N'-bis[2-(2,5-dichlorophenyl)-2-oxoethyl]-1,4 - butylenebiscarboxamide (I: Ar=2,5-Cl$_2$C$_6$H$_3$, X=(CH$_2$)$_4$, Y+Y'=0) (12.2 g., M.P. 153.0–158.8° C.).

Reduction of N,N'-bis[2-(2,5-dichlorophenyl)-2-oxoethyl]-1,4-butylenebiscarboxamide with diborane affords N,N'-(1,6 - hexylene) - bis[2 - (2,5 - dichlorophenyl)-2-hydroxyethylamine] (II: Ar=2,5-Cl$_2$C$_6$H$_3$, X=(CH$_2$)$_4$).

EXAMPLE 13

Condensation of α-amino-3,5-dichloro - 2 - methoxyacetophenone hydrochloride and adipoyl chloride affords N,N'-bis[2-(3,5 - dichloro - 2 - methoxyphenyl) - 2 - oxoethyl] - 1,4 - butylenebiscarboxamide (I: Ar=3,5-Cl$_2$-2-CH$_3$OC$_6$H$_2$, X=(CH$_2$)$_4$, Y+Y'=0).

Reduction of N,N'-bis[2-(3,5 - dichloro - 2 - methoxyphenyl)-2-oxoethyl] - 1,4 - butylenebiscarboxamide with diborane affords N,N'-(1,6-hexylene)-bis[2-(3,5-dichloro-2-methoxyphenyl)-2 - hydroxyethylamine] (II: Ar=3,5-Cl$_2$-2-CH$_3$OC$_6$H$_2$, X=(CH$_2$)$_4$).

EXAMPLE 14

Condensation of α-amino - m - (trifluoromethyl)acetophenone hydrochloride and adipoyl chloride affords N,N'-bis[2-(m-(trifluoromethyl)phenyl) - 2 - oxoethyl] - 1,4-butylenebiscarboxamide (I: Ar=m-CF$_3$C$_6$H$_4$, X=(CH$_2$)$_4$, Y+Y'=0).

Reduction of N,N'-bis[2-(m-(trifluoromethyl)phenyl)-2-oxoethyl] - 1,4 - butylenebiscarboxamide with diborane affords N,N'-(1,6-hexylene)-bis[2-(m - (trifluoromethyl) phenyl) - 2 - hydroxyethylamine] (II: Ar=m-CF$_3$C$_6$H$_4$, X=(CH$_2$)$_4$).

EXAMPLE 15

Condensation of α-amino - p - (dimethylamino)acetophenone hydrochloride and adipoyl chloride affords N,N'-bis[2-(p-(dimethylamino)phenyl) - 2 - oxoethyl] - 1,4-butylenebiscarboxamide (I: Ar=p-(CH$_3$)$_2$NC$_6$H$_4$, X=(CH$_2$)$_4$, Y+Y'=0).

Reduction of N,N'-bis[2-(p-(dimethylamino)phenyl)-2-oxoethyl] - 1,4 - butylenebiscarboxamide with diborane affords N,N'-(1,6-hexylene)-bis[2 - (p - (dimethylamino) phenyl)-2-hydroxyethylamine] (II: Ar=p-(CH$_3$)$_2$NC$_6$H$_4$, X=(CH$_2$)$_4$).

EXAMPLE 16

Condensation of α-amino - p - acetamidoacetophenone hydrochloride and adipoyl chloride affords N,N'-bis[2-(p-acetamidophenyl) - 2 - oxoethyl] - 1,4 - butylenebiscarboxamide (I: Ar=p-CH$_3$CONHC$_6$H$_4$, X=(CH$_2$)$_4$, Y+Y'=0).

Reduction of N,N'-bis[2-(p-acetamidophenyl) - 2 - oxoethyl]-1,4-butylenebiscarboxamide with diborane affords N,N'-(1,6-hexylene) - bis[2 - (p - acetamidophenyl) - 2-hydroxyethylamine] (II: Ar=p-CH$_3$CONHC$_6$H$_4$,

X=(CH$_2$)$_4$).

EXAMPLE 17

In a manner similar to that of Example 1, condensation of α-amino-m-nitroacetophenone hydrochloride (27 g.) and adipoyl chloride (11.4 g.) and two recrystallizations of the resulting product (18.1 g.) from nitromethane gave N,N'-bis[2-(m-nitrophenyl)-2-oxoethyl]-1,4-butylenebiscarboxamide (I: Ar=m-O$_2$NC$_6$H$_4$, X=(CH$_2$)$_4$, Y+Y'=0)

(14.8 g., M.P. 193.4–196.2° C.).

Reduction of N,N'-bis[2-(m-nitrophenyl)-2-oxoethyl]-1,4-butylenebiscarboxamide with diborane affords N,N'-(1,6 - hexylene) - bis[2 - m-nitrophenyl)-2-hydroxyethylamine] (II: Ar=m-O$_2$NC$_6$H$_4$, X=(CH$_2$)$_4$.

EXAMPLE 18

In a manner similar to that of Example 1, condensation of α-amine-p-nitroacetophenone hydrochloride (three runs, 5 g., 13 g. and 15 g.) and adipoyl chloride (2.11 g., 5.5 g. and 6.33 g.) and two recrystallizations of the combined products (21 g.) from N,N-dimethylformamide gave N,N'-bis[2 - (p-nitrophenyl)-2-oxoethyl]-1,4-butylenebiscarboxamide (I: Ar=p-O$_2$NC$_6$H$_4$, X=(CH$_2$)$_4$, Y+Y'=0)

(10.0 g., M.P. 218.6–222.0° C.).

In a manner similar to that of Example 1, reduction of N,N'-bis[2 - (p-nitrophenyl)-2-oxoethyl]-1,4-butylenebiscarboxamide (48 g.) with diborane (1 M in tetrahydrofuran, 815 ml.) and recrystallization of the resulting product (40 g.) from methanol gave N,N'-(1,6-hexylene)-bis[2 - (p-nitrophenyl)-2-hydroxyethylamine] (II: Ar=p-O$_2$NC$_6$H$_4$, X=(CH$_2$)$_4$ (21.2 g., M.P. 124–126° C.).

EXAMPLE 19

In a manner similar to that of Example 1, condensation of α-amino-p-(methylthio)acetophenone hydrochloride (42.6 g.) and adipoyl chloride (18 g.) and recrystallization of the resulting product (26.6 g.) from N,N-dimethylformamide gave N,N'-bis[2-(p-(methylthio)phenyl)-2-oxoethyl]-1,4-butylenebiscarboxamide (I: Ar=p-CH$_3$SC$_6$H$_4$, X=(CH$_2$)$_4$, Y+Y'=0)

(23.6 g., M.P. 230.0–233.0° C.).

In a manner similar to that of Example 8, reduction of N,N' - bis[2 - (p-methylthio)phenyl]-2-oxoethyl]-1,4-butylenebiscarboxamide (19 g.) with lithium aluminum hydride (4 g.) and recrystallization of the resulting product from methanol gave N,N'-(1,6-hexylene)-bis[2-(p-(methylthio)phenyl)-2-hydroxyethylamine]

(II: Ar=p-CH$_3$SC$_6$H$_4$, X=(CH$_2$)$_4$ (7 g., M.P. 134.0–135.8° C.).

EXAMPLE 20

Condensation of α-amino-p-(methylsulfonyl)acetophenone hydrochloride and adipoyl chloride affords N,N'-bis[2 - (p-(methylsulfonyl)phenyl) - 2 - oxoethyl]-1,4-butylenebiscarboxamide (I: Ar=p-CH$_3$SO$_2$C$_6$H$_4$, X=(CH$_2$)$_4$, Y+Y'=0).

Reduction of N,N'-bis[2-(p-(methylsulfonyl)phenyl)-2-oxoethyl] - 1,4 - butylenebiscarboxamide with lithium aluminum hydride affords N,N'-(1,6-hexylene)-bis[2-(p-(methylsufonyl) - phenyl) - 2 - hydroxyethylamine] (II: Ar=p-CH$_3$SO$_2$C$_6$H$_4$, X=(CH$_2$)$_4$).

EXAMPLE 21

In a manner similar to that of Example 1, condensation of α-amino-3,4-dichloroacetophenone hydrochloride (20 g.) and succinyl chloride (6.35 g.) and recrystallization of the resulting product (13.6 g.) from N,N-dimethylformamide gave N,N'-bis[2-(3,4-dichlorophenyl)-2-oxoethyl]ethylenebiscarboxamide (I: Ar=3,4-Cl$_3$C$_6$H$_3$, X=(CH$_2$)$_2$, Y+Y'=0) (10.2 g., M.P. 202.6–205.0° C.).

Reduction of N,N'-bis[2-(3,4-dichlorophenyl)-2-oxoethyl]ethylenebiscarboxamide with lithium aluminum hydride affords N,N' - (1,4-butylene)-bis[2-(3,4-dichlorophenyl) - 2 - hydroxyethylamine] (II: Ar=3,4-Cl$_2$C$_6$H$_3$, X=(CH$_2$)$_2$).

EXAMPLE 22

In a manner similar to that of Example 1, condensation of α-amino-p-nitroacetophenone hpdrochloride (four runs, 15 g. twice and 20 g. twice) and succinyl chloride (5.35 g. twice and 7.15 g. twice) and four recrystallizations of the combined products from N,N-dimethylformamide gave N,N'-bis[2-(p-nitrophenyl)-2-oxoethyl]ethylenebiscarboxamide (I: Ar=p-O$_2$NC$_6$H$_4$, X=(CH$_2$)$_2$, Y+Y'=0) (12.4 g., M.P. 224.0° C. with decomposition).

Reduction of N,N'-bis[2-(p-nitrophenyl)-2-oxoethyl]-ethylenebiscarboxamide with lithium aluminum hydride affords N,N'-(1,4-butylene)-bis[2-(p-nitrophenyl)-2-hydroxyethylamine] (II: Ar=p-O$_2$NC$_6$H$_4$, X=(CH$_2$)$_2$).

EXAMPLE 23

Condensation of α-amino-p-bromoacetophenone hydrochloride and glutaryl chloride affords N,N'-bis[2-(p-bromophenyl)-2-oxoethyl]-1,3 - propylenebiscarboxamide (I: Ar=p-BrC$_6$H$_4$, X=(CH$_2$)$_3$, Y+Y'=0).

Reduction of N,N'-bis[2 - (p-bromophenyl)-2-oxoethyl]-1,3-propylenebiscarboxamide with lithium aluminum hydride affords N,N'-(1,5 - pentylene)-bis[2-(p-bromophenyl) - 2 - hydroxyethylamine] (II: Ar=p-BrC$_6$H$_4$, X=(CH$_2$)$_3$).

EXAMPLE 24

Condensation of α-amino-p-bromoacetophenone hydrochloride and pimeloyl chloride affords N,N'-bis[2-(p-bromophenyl)-2-oxoethyl]-1,5 - pentylenebiscarboxamide (I: Ar=p-BrC$_6$H$_4$, X=(CH$_2$)$_5$, Y+Y'=0).

Reduction of N,N'-bis[2-(p-bromophenyl)-2-oxoethyl]-1,5-pentylenebiscarboxamide with lithium aluminum hydride affords N,N'-(1,7-heptylene)-bis[2-(p-bromophenyl)-2-hydroxyethylamine] (II: Ar=p-BrC$_6$H$_4$,

X=(CH$_2$)$_5$)

EXAMPLE 25

Condensation of α-amino-p-bromoacetophenone hydrochloride and suberoyl chloride affords N,N'-bis[2-(p-bromophenyl)-2-oxoethyl] - 1,6 - hexylenebiscarboxamide (I: Ar=p-BrC$_6$H$_4$, X=(CH$_2$)$_6$, Y+Y'=0).

Reduction of N,N'-bis[2-(p-bromophenyl)-2-oxoethyl]-1,6-hexylenebiscarboxamide with lithium aluminum hydride affords N,N'-(1,8-octylene)-bis[2-(p-bromophenyl)-2-hydroxyethylamine] (II: Ar=p-BrC$_6$H$_4$, X=(CH$_2$)$_6$).

EXAMPLE 26

Condensation of α-amino-β-bromoacetophenone hydrochloride and azelaoyl chloride affords N,N'-bis[2-(p-bromophenyl) - 2 - oxoethyl] - 1,7 - heptylenebiscarboxamide (I: Ar=p-BrC$_6$H$_4$, X=(CH$_2$)$_7$, Y+Y'=0).

Reduction of N,N'-bis[2-(p-bromophenyl)-2-oxoethyl]-1,7-heptylenebiscarboxamide with lithium aluminum hydride affords N,N'-(1,9-nonylene)-bis[2-(p-bromophenyl)-2-hydroxyethylamine] (II: Ar=p-BrC$_6$H$_4$,

X=(CH$_2$)$_7$)

EXAMPLE 27

Condensation of α-amino-p-bromoacetophenone hydrochloride and sebacoyl chloride affords N,N'-bis[2-(p-bromophenyl)-2-oxoethyl] - 1,8 - octylenebiscarboxamide (I: Ar=p-BrC$_6$H$_4$, X=(CH$_2$)$_8$, Y+Y'=0).

Reduction of N,N'-bis[2-(p-bromophenyl)-2-oxoethyl]-1,8-octylenebiscarboxamide with lithium aluminum hydride affords N,N'-(1,10-decylene)-bis[2-(p-bromophenyl)-2-hydroxyethylamine] (II: Ar =p-BrC$_6$H$_4$, X=(CH$_2$)$_8$)

EXAMPLE 28

Condensation of α-amino-p-bromoacetophenone hydrochloride and 1,9-nonylenebiscarbonyl chloride affords N,N'-bis[2-(p-bromophenyl) - 2 - oxoethyl]-1,9-nonylenebiscarboxamide (I: Ar=p-BrC$_6$H$_4$, X=(CH$_2$)$_9$, Y+Y'=0)

Reduction of N,N'-bis[2-(p-bromophenyl)-2-oxoethyl]-1,9-nonylenebiscarboxamide with lithium aluminum hydride affords N,N' - (1,11 - undecylene)-bis[2-(p-bromophenyl) - 2 - hydroxyethylamine] (II: Ar=p-BrC$_6$H$_4$, X=(CH$_2$)$_9$).

EXAMPLE 29

Condensation of α-amino-p-bromoacetophenone hydrochloride and 1,10-decylenebiscarbonyl chloride affords N,N'-bis[2-(p-bromophenyl) - 2 - oxoethyl]-1,10-decylenebiscarboxamide (I: Ar=p-BrC$_6$H$_4$, X=(CH$_2$)$_{10}$, Y+Y'=0).

Reduction of N,N'-bis[2-(p-bromophenyl)-2-oxoethyl]-1,10-decylenebiscarboxamide with lithium aluminum hydride affords N,N' - (1,12 - dodecylene)-bis[2-(p-bromophenyl) - 2 - hydroxyethylamine] (II: Ar=p-BrC$_6$H$_4$, X=(CH$_2$)$_{10}$).

EXAMPLE 30

Condensation of α-amino-p-bromoacetophenone hydrochloride and 3-methyladipoyl chloride affords N,N'-bis[2-(p-bromophenyl) - 2 - oxoethyl] - 2 - methyl-1,4-butylenebiscarboxamide (I: Ar=pBrC$_6$H$_4$,

X=CH$_2$CH(CH$_3$)CH$_2$CH$_2$, Y+Y'=0).

Reduction of N,N'-bis[2-(p-bromophenyl)-2-oxoethyl]-2-methyl-1,4-butylenebiscarboxamide with lithium aluminum hydride affords N,N'-(3-methyl-1,6-hexylene)-bis[2-(p-bromophenyl)-2-hydroxyethylamine]

(II: Ar=p-BrC$_6$H$_4$, X=CH$_2$CH(CH$_3$)CH$_2$CH$_2$).

EXAMPLE 31

A mixture of N,N'-bis[2-(p-bromophenyl)-2-oxoethyl]-1,4-butylenebiscarboxamide (10 g.), sodium borohydride (1.4 g.) and methanol (200 ml.) was heated briefly with stirring (to about 40° C.). The mixture formed a solution, which was allowed to stand (for 2 hr.) at room temperature, then stripped of methanol. The solid obtained by treatment of the residue with water was recrystallized from ethyl acetate, affording N,N'-bis[2-(p-bromophenyl) - 2 - hydroxyethyl] - 1,4 - butylenebiscarboxamide (I: Ar=p-BrC$_6$H$_4$, X=(CH$_2$)$_4$, Y=H, Y'=OH) (7.3 g., M.P. 195.6–196.4° C.).

Table IV shows the results of the antibacterial testing in vitro of N,N'-bis[2-(p-bromophenyl)-2-hydroxyethyl]-1,4-butylenebiscarboxamide.

TABLE IV

| Microorganism | Concentration (p.p.m.) | |
|---|---|---|
| | Bacteriostatic | Bactericidal |
| Staphylococcus aureus | 100 | >100 |
| Eberthella typhi | 100 | >100 |
| Clostridium welchii | >100 | |
| Pseudomonas aeruginosa | 75 | >100 |

EXAMPLE 32

In a manner similar to that of Example 31, reduction of N,N' - bis[2 - (m-chlorophenyl)-2-oxoethyl]-1,4-butylenebiscarboxamide (10 g.) with sodium borohydride (1.6 g.) and recrystallization of the resulting product from ethyl acetate gave N,N'-bis[2-(m-chlorophenyl)-2-hydroxyethyl]-1,4-butylenebiscarboxamide (I: Ar=m-ClC$_6$H$_4$, X=(CH$_2$)$_4$, Y=H, Y'=OH) (8.6 g., M.P. 122.6–137.0° C.).

EXAMPLE 33

In a manner similar to that of Example 31, reduction of N,N'-bis[2-(p-chlorophenyl)-2-oxoethyl]-1,4-butylenebiscarboxamide (two runs, 10 g. and 27.8 g.) with sodium borohydride (1.64 g. and 4.6 g.) and two recrystallizations of the combined products from methanol gave N,N'-bis[2 - (p - chlorophenyl) - 2 - hydroxyethyl] - 1,4 - butylenebiscarboxamide (Ar=p-ClC$_6$H$_4$, X=(CH$_2$)$_4$, Y=H, Y'=OH) (11.4 g., M.P. 191.0–193.0° C.).

EXAMPLE 34

In a manner similar to that of Example 31, reduction of N,N'-bis[2-(3,4-dichlorophenyl)-2-oxoethyl]-1,4-butylenebiscarboxamide (20 g.) with sodium borohydride (3 g.) and recrystallization of the resulting product from ethyl acetate gave N,N'-bis[2-(3,4-dichlorophenyl)-2-hydroxyethyl]-1,4-butylenebiscarboxamide (I: Ar=3,4-Cl$_2$C$_6$H$_3$, X=(CH$_2$)$_4$, Y=H, Y'=OH) (14.4 g., M.P. 133.8–136.0° C.).

EXAMPLE 35

In a manner similar to that of Example 31, reduction of N,N'-bis[2-(p-methylthiophenyl)-2-oxoethyl]-1,4-butylenebiscarboxamide (two runs, 3.47 g. and 21.7 g.) with sodium borohydride (0.57 g. and 3.6 g.) using dioxane as cosolvent and washing the products with water gave N,N'-bis[2 - (p - methylthiophenyl) - 2 - hydroxyethyl] - 1,4-butylenebiscarboxamide (I: Ar=CH$_3$SC$_6$H$_4$, X=(CH$_2$)$_4$, Y=H, Y'=OH) (17.5 g., M.P. 197.0–199.0° C.).

EXAMPLE 36

In a manner similar to that of Example 31, reduction of N,N'-bis[2-(3,4-dichlorophenyl)-2-oxoethyl]ethylenebiscarboxamide (19.5 g.) with sodium borohydride (3.1 g.) and trituration of the resulting product with methanol gave N,N'-bis[2-(3,4-dichlorophenyl)-2-hydroxethyl]ethylenebiscarboxamide (I: Ar=3,4-Cl$_2$C$_6$H$_3$, X=(CH$_2$)$_2$, Y=H, Y'=OH) (9 g., M.P. 209.2–212–6° C.).

I claim:

1. N,N' - bis[2 - (Ar) - 2 - (Y) - 2 - (Y') - ethyl] - (X)-bis-carboxamide of the formula

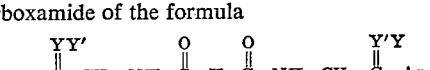

wherein:
Ar is phenyl substituted by one to three members selected from the group consisting of non-tertiary, a tertiary alkoxy of one to four carbon atoms and halo or by a member selected from the group consisting of trifluoromethyl, dimethylamino, acetamido, nitro, methylthio and methylsulfonyl;

X is alkylene of two to ten carbon atoms with bonds to the adjacent carbon atoms at different carbon atoms; and Y taken together with Y' is carbonyl oxygen.

2. N,N' - bis[2 - (p - bromophenyl) - 2 - oxoethyl] - 1,4-butylenebiscarboxamide according to claim 1.

3. N,N' - bis[2 - (p - methoxyphenyl) - 2 - oxoethyl]-1,4-butylenebiscarboxamide according to claim 1.

4. N,N' - bis[2 - (m - chlorophenyl) - 2 - oxoethyl]-1,4-butylenebiscarboxamide according to claim 1.

5. N,N' - bis[2 - (p - chlorophenyl) - 2 - oxoethyl] - 1,4-butylenebiscarboxamide according to claim 1.

6. N,N' - bis[2 - (3,4 - dichlorophenyl) - 2 - oxoethyl]-1,4-butylenebiscarboxamide according to claim 1.

7. N,N' -bis[2 - (2,5 - dichlorophenyl) - 2 - oxoethyl]-1,4-butylenebiscarboxamide according to claim 1.

8. N,N' - bis[2 - (m - nitrophenyl) - 2 - oxoethyl] - 1,4-butylenebiscarboxamide according to claim 1.

9. N,N' - bis[2-(p - nitrophenyl) - 2 - oxoethyl] - 1,4-butylenebiscarboxamide according to claim 1.

10. N,N' - bis[2 - (p - methylthiophenyl) - 2 - oxoethyl]1,4-butylenebiscarboxamide according to claim 1.

11. N,N' - bis[2 - (3,4 - dichlorophenyl) - 2 - oxoethyl]-ethylenebiscarboxamide according to claim 1.

12. N,N' - bis[2 - (p - nitrophenyl) - 2 - oxoethyl]-ethylenebiscarboxamide according to claim 1.

13. N,N'-bis[2 - (Ar) - 2 - (Y) - 2 - (Y') - ethyl]-(X)-biscarboxamide of the formula

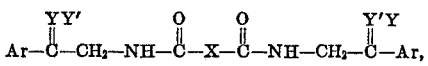

wherein:
Ar is phenyl or phenyl substituted by one to three members selected from the group consisting of non-tertiary alkyl of one to four carbon atoms, non-tertiary alkoxy of one to four carbon atoms and halo or by a member selected from the group consisting of trifluoromethyl, dimethylamino, acetamido, nitro, methylthio and methylsulfonyl;
X is alkylene of two to ten carbon atoms with bonds to the adjacent carbon atoms at different carbon atoms;
Y is hydrogen; and
Y' is hydroxyl.

14. N,N' - bis[2 - (p - bromophenyl) - 2 - hydroxyethyl]-1,4-butylenebiscarboxamide according to claim 13.

15. N,N' - bis[2 - (m -chlorophenyl) - 2 - hydroxyethyl]-1,4-butylenebiscarboxamide according to claim 13.

16. N,N' - bis[2 - (p - chlorophenyl) - 2 - hydroxyethyl]-1,4-butylenebiscarboxamide according to claim 13.

17. N,N' - bis[2 - (3,4 - dichlorophenyl) - 2 - hydroxyethyl]-1,4-butylenebiscarboxamide according to claim 13.

18. N,N' - bis[2 - (p - methylthiophenyl) - 2 - hydroxyethyl]-1,4-butylenebiscarboxamide according to claim 13.

19. N,N' - bis[2 - (3,4 - dichlorophenyl) - 2 - hydroxyethyl]-ethylenebiscarboxamide according to claim 13.

References Cited
UNITED STATES PATENTS

| | | | |
|---|---|---|---|
| 3,148,216 | 9/1964 | Shapiro et al. | 260—558 |
| 3,148,194 | 9/1964 | Waugh et al. | 260—307 |
| 2,483,392 | 10/1949 | Meyer et al. | 260—307 |

OTHER REFERENCES

Nagornaya et al., Chem. Abst., vol. 59, col. 3998a-b (1963).

Sych et al., Chem. Abstract, vol. 63, col. 4424b-e (1965).

Sych et al. II, Optics & Spectroscopy, vol. 13, p. 288–90 (1962).

HARRY I. MOATZ, Primary Examiner

U.S. Cl. X.R.

260—562 R, 570.5 C, 559 A; 424—324

UNITED STATES PATENT AND TRADEMARK OFFICE
CERTIFICATE OF CORRECTION

PATENT NO. : 3,775,477
DATED : November 27, 1973
INVENTOR(S) : Guy D. Diana

It is certified that error appears in the above—identified patent and that said Letters Patent are hereby corrected as shown below:

Claim 1, line 6, ", a tertiary" should be deleted.

Signed and Sealed this

Ninth Day of November 1976

[SEAL]

Attest:

RUTH C. MASON
*Attesting Officer*

C. MARSHALL DANN
*Commissioner of Patents and Trademarks*